US009529554B2

(12) United States Patent
Akiyama (10) Patent No.: US 9,529,554 B2
(45) Date of Patent: Dec. 27, 2016

(54) PRINTER DRIVER DEVICE, PRINTER, AND PRINTER SYSTEM FOR MORE EFFICIENT COMPRESSION AND TRANSFER OF RASTER DATA

(71) Applicant: RISO KAGAKU CORPORATION, Tokyo (JP)

(72) Inventor: Toshio Akiyama, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 45 days.

(21) Appl. No.: 14/535,570

(22) Filed: Nov. 7, 2014

(65) Prior Publication Data

US 2015/0138603 A1    May 21, 2015

(30) Foreign Application Priority Data

Nov. 20, 2013  (JP) ................................ 2013-239819

(51) Int. Cl.
| | | |
|---|---|---|
| G06F 3/12 | (2006.01) | |
| G06K 15/02 | (2006.01) | |
| H04N 1/56 | (2006.01) | |
| H04N 1/60 | (2006.01) | |

(52) U.S. Cl.
CPC ........... G06F 3/1211 (2013.01); G06F 3/1214 (2013.01); G06F 3/1215 (2013.01); G06F 3/1241 (2013.01); G06F 3/1244 (2013.01); G06F 3/1276 (2013.01); G06F 3/1285 (2013.01); G06K 15/184 (2013.01); G06K 15/1852 (2013.01); H04N 1/56 (2013.01); H04N 1/6094 (2013.01); *G06F 3/122* (2013.01)

(58) Field of Classification Search
CPC combination set(s) only.
See application file for complete search history.

(56) References Cited

U.S. PATENT DOCUMENTS

| | | | |
|---|---|---|---|
| 6,825,941 B1 * | 11/2004 | Nguyen | ................ G06F 3/1227 358/1.13 |
| 8,820,891 B2 | 9/2014 | Bansyo | |
| 8,919,907 B1 | 12/2014 | Shimomura | |
| 2003/0041765 A1 * | 3/2003 | Hill | ........................ G06Q 30/08 101/484 |

(Continued)

FOREIGN PATENT DOCUMENTS

JP        2007-228067         9/2007

OTHER PUBLICATIONS

Extended European Search Report in EP 14193633, mailed Apr. 16, 2015.

*Primary Examiner* — Christopher D Wait
(74) *Attorney, Agent, or Firm* — Greenblum & Bernstein, P.L.C.

(57) ABSTRACT

A printer driver device includes: an ink-based maximum tone level determination unit configured to determine maximum tone levels for respective types of ink for raster data on an image generated by a layout setting section, based on contents of a print setting information of the image; and a data volume determination unit configured to generate tone datasets on the respective types of ink for each pixel of the image based on the maximum tone levels determined by the ink-based maximum tone level determination unit, and transfer the generated tone datasets as the raster data by connecting the generated tone datasets by use of a line-interleaved format or a band-sequential format.

12 Claims, 4 Drawing Sheets

(56) References Cited

U.S. PATENT DOCUMENTS

2009/0021791 A1* 1/2009 Ebner ............... H04N 1/4105
  358/3.06
2013/0071912 A1* 3/2013 Sisler ................ D21H 21/16
  435/264
2014/0354724 A1   12/2014 Shimomura et al.

* cited by examiner

PRINTER DRIVER DEVICE, PRINTER, AND PRINTER SYSTEM FOR MORE EFFICIENT COMPRESSION AND TRANSFER OF RASTER DATA

CROSS REFERENCE TO RELATED APPLICATION

This application is based upon and claims the benefit of priority from the prior Japanese Patent Application No. 2013-239819, filed on Nov. 20, 2013, the entire contents of which are incorporated herein by reference.

BACKGROUND

1. Technical Field

The disclosure relates to a printer system in which a printer prints an image using multiple types of ink based on a print job generated by a printer driver device. The present disclosure also relates to the printer driver device and the printer used in the printer system.

2. Related Art

In order for a printer to print an image based on a print job generated by a printer driver device, the printer driver device compresses raster data on the image to reduce the volume of data to transfer and transmits the compressed data to the printer. The printer then decompresses the data received.

Japanese Patent Application Publication No. 2007-228067 proposes a technique for reducing the overall data volume by selectively using a method of compressing raster data depending on the raster data.

Specifically, in Japanese Patent Application Publication No. 2007-228067, a compression method that can compress text data at a high compression rate is employed for raster data for black which is likely to be used for text, while a compression method that can compress data other than text, such as graphics, at a high compression rate is employed for raster data for colors other than black which are likely to be used for an object other than text.

SUMMARY

There are various data compression methods. Typically, the larger the volume of data to compress, the lower the compression efficiency. For this reason, it is important to reduce the volume of pre-compressed data as much as possible in order to efficiently reduce the volume of transfer data by the data compression.

Frames are used to transfer the pre-compressed data to a processor that performs the data compression processing. A frame typically has a data field of 1 byte (8 bits), and the data transfer is performed using this data field. Thus, typically, to transfer tone datasets on respective colors constituting a color image to the processor, one frame is used for each color.

However, since a tone dataset on each ink color usually takes up less than 8 bits (up to 256 tone levels), transferring tone datasets by using one frame for each color causes the data field of each frame to contain extra bits representing no tone data. The processor has to compress the data in the data field containing the extra bits; therefore, the volume of data compressed by the processor is larger than the volume of the tone data. Accordingly, the efficiency of compressing the tone data lowers.

If a tone dataset on each ink color takes up a maximum of 4 bits, the data field has four extra bits. Thus, a tone dataset on another color can be inserted into those extra bits. Thereby, tone datasets for four colors can be transferred in two frames. Moreover, since the data fields have no extra bit, the processor only has to compress the tone datasets, and the efficiency of compressing the tone datasets increases.

However, if a tone dataset on each ink color takes up a maximum of 5 bits, the data field has three extra bits; therefore, not all the bits of a tone dataset on another color can be inserted into those extra bits. Consequently, the last two bits of the tone dataset on the second color have to be inserted to the head of the data field of the next frame.

For this reason, to transfer tone datasets on respective colors each taking up a maximum of 5 bits to the processor, three frames are needed because two frames are not enough unlike the case where each tone dataset takes up a maximum of 4 bits. Hence, in this case, the number of frames compressed by the processor is larger than that in the case of the tone datasets each taking up a maximum of 4 bits, and therefore the efficiency of compressing the tone datasets lowers.

Moreover, since the data field of the third frame contains extra bits, the processor has to compress the data in the data field containing the extra bits; therefore, the volume of data compressed by the processor is larger than the volume of the tone data. Accordingly, the efficiency of compressing the tone data lowers.

Moreover, if a printer has a capability of, for example, printing a photographic color image on a sheet of plain paper, the tone data includes not only the tone datasets on four colors of ink, but also a 1-bit-long tone dataset indicating whether or not to coat the surface of the print sheet with pre-coat ink or not (0=not coat, 1=coat). The tone dataset on functional ink, such as the pre-coat ink, which is not directly involved with image formation is also transferred to the processor along with the tone datasets on the four colors of ink, and compressed together by the processor.

In this case, even if the tone dataset on each of the four colors takes up a maximum of 4 bits, two frames are not enough to transfer the tone datasets on five types of ink: the four colors and the functional ink. Thus, a third frame is needed. Hence, also in this case, the number of frames compressed by the processor is larger than that in the case of the tone datasets each taking up a maximum of 4 bits, and the efficiency of data compression therefore lowers.

Moreover, since the data field of the third frame contains extra bits, the processor has to compress data larger than the tone data, and the efficiency of data compression therefore lowers.

The present invention has an objective of providing a printer system capable of reducing as much as possible the data volume of raster data to be transferred from a printer driver device to a printer, the raster data indicating an image to be printed using multiple types of ink, and also of providing the printer driver device and the printer used in the printer system.

A printer driver device in accordance with some embodiments includes: a layout setting section configured to generate raster data on an image to be printed with a plurality of types of ink; an ink-based maximum tone level determination unit configured to determine maximum tone levels for the respective types of ink for the raster data generated by the layout setting section, based on contents of a print setting information of the image; a data volume determination unit configured to generate tone datasets on the respective types of ink for each pixel of the image based on the maximum tone levels determined by the ink-based maximum tone level determination unit, and transfer the generated tone datasets as the raster data by connecting the generated tone datasets by use of a line-interleaved format or a band-sequential format; and a job output unit configured to output to a printer a print job containing the raster data transferred from the data volume determination unit and the print setting information.

The job output unit may be configured to perform compression processing on the raster data transferred from the data volume determination unit to obtain print data, and output to the printer the print job containing the obtained print data and the print setting information.

According to the above configuration, the printer driver device can transfer raster data on an image to be printed to the printer, with the data volume of the raster data being reduced as much as possible. Thus, for example, the efficiency of data compression of the raster data which is to be transferred from the printer driver device to the printer can be increased.

To be more precise, the maximum tone levels for raster data, the print-paper type (such as plain paper, lightweight paper, or matt paper), the resolution of raster data (such as 300 dpi or 600 dpi), and the color mode (such as color print, black-and-white print, false-color print for black-and-white originals, or print accompanying coating of the surface of print paper using pre-coat ink) can be specified from the contents of print setting information. The maximum tone levels are set based on the print-paper type, the resolution of raster data, and the color mode.

For example, when the resolution of raster data is 300 dpi, the maximum tone level is six (zero to five drops of ink ejection) for plain paper and is eight (zero to seven drops of ink ejection) for matt paper. Hence, the data volume of each of the tone datasets is up to three bits.

Then, in an example where the color mode is color print, there are four tone datasets for the respective colors ofC (cyan), M(magenta), Y (yellow), and K (black). In addition, if the color mode accompanies surface coating of print paper with pre-coat ink, there is also a tone dataset for the pre-coat ink.

Thus, the maximum tone levels for raster data are determined for the respective types of ink based on the print setting information, and the data volume of raster data is determined based on the maximum tone levels, the raster data being formed by connecting tone datasets on the respective types of ink for each pixel according to the line-interleaved format or the band-sequential format. Then, the raster data of the determined data volume is included in a print job along with information indicating the data volume and is outputted to the printer.

Hence, the data volume of the raster data is the volume of data formed by connecting tone datasets on the respective types of ink for each pixel according to the line-interleaved format or the band-sequential format. Thus, even if a data field has an extra bit, unnecessary data represented by the extra bit does not constitute the raster data. The data volume of the raster data can therefore be reduced as much as possible. Thus, for example, the efficiency of data compression of the raster data which is to be transferred from the printer driver device to the printer can be increased.

A printer in accordance with some embodiments includes: a print job reception unit configured to receive the print job from the above printer driver device; an ink-based maximum tone level specification unit configured to specify the maximum tone levels for the raster data on the image based on the print setting information received by the print job reception unit and specify data volume of the raster data based on the specified maximum tone levels; a data decomposition unit configured to decompose the raster data having the data volume specified by the ink-based maximum tone level specification unit into the tone datasets on the respective types of ink for each pixel according to the line-interleaved format or the band-sequential format employed to connect the tone datasets on the respective types of ink for each pixel of the raster data; and a printing unit configured to print the image based on the decomposed tone datasets.

According to the above configuration, since the raster data contained in the print job received by the printer is the raster data outputted from the printer driver device, this raster data does not contain data represented by an extra bit in the data field of a frame used in transfer of the raster data.

The data volume of raster data and the maximum tone levels for the respective types of ink for raster data can be specified from the print setting information in the print job received by the printer. For this reason, raster data of the specified data volume can be extracted and decomposed (reproduced) into tone datasets on the respective types of ink for each pixel according to a format used to connect the tone datasets on the respective types of ink for each pixel of the raster data based on the maximum tone levels of the respective types of ink for the raster data which are specified from the print setting information.

Since the printer can thus reproduce raster data on an image to be printed with multiple types of ink based on a print job received from the printer driver device, the printer driver device can reduce the data volume of the raster data as much as possible. Thus, for example, the efficiency of data compression of the raster data which is to be transferred from the printer driver device to the printer can be increased.

A printer system in accordance with some embodiments includes the above printer driver device and the above printer.

According to the above configuration, advantageous effects can be offered by each of the printer driver device and the printer.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 1:
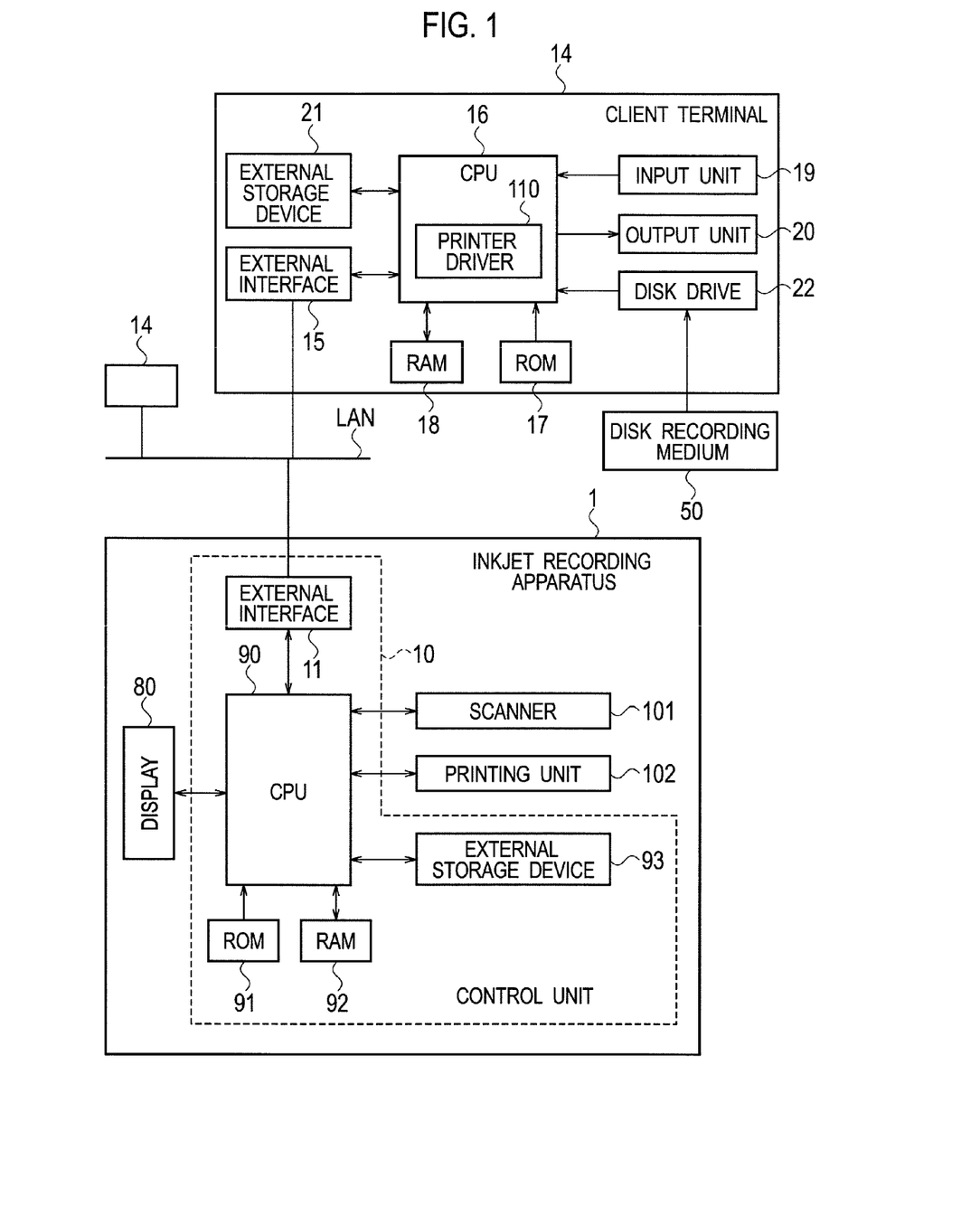
FIG. 1 is a block diagram showing the schematic configuration of a printer network system according to one embodiment of the present invention.

An embodiment of the present invention is described below with reference to the drawings. FIG. 1 is a diagram illustrating the schematic configuration of a print network system according to one embodiment of the present invention.

As shown in FIG. 1, the printer network system (a printer system) of this embodiment has an inkjet recording apparatus 1 (printer) and a client terminal 14 (a printer driver device).

The inkjet recording apparatus 1 is a printing apparatus configured to execute a print job according to a print command made through user operation. The inkjet recording apparatus 1 of this embodiment is an inkjet line color printer. The inkjet recording apparatus 1 includes multiple ink heads each having many nozzles. The inkjet recording apparatus 1 prints an image line by line by ejecting different colors (types) of ink from the respective ink heads and thereby forms multiple superimposing images onto a print sheet on a conveyer belt.

The inkjet recording apparatus 1 includes: a scanner 101 configured to scan image information on an original as an image on an original (called an original image hereinbelow) and output image signals; a printing unit 102 configured to print (record) the original image onto a print sheet (on one side or both sides thereof) based on the image signals outputted from the scanner 101; and a control unit 10 configured to control the overall operation of the inkjet recording apparatus 1. The print sheet on which the printing unit 102 prints an original image is conveyed from a paper feeder (not shown) to the printing unit 102 and then to a paper discharger (not shown).

As shown in FIG. 1, external interfaces 15 of multiple client terminals 14 (only one client terminal 14 is shown in FIG. 1 as a representative) are connected to an external interface 11 of the control unit 10 through a local area network LAN. The control unit 10 receives a print job for an original image from each client terminal 14, and generates raster data on the original image based on the print job received. The inkjet recording apparatus 1 causes the printing unit 102 to print the original image onto a print sheet under conditions specified in the print job.

The printing unit 102 has ink heads configured to eject the respective colors of C (cyan), M (magenta), Y (yellow), and K (black), as well as an ink head configured to eject functional ink. Examples of the functional ink include clear and colorless pre-coat ink designed to suppress penetration of ink into a print sheet. For example, in a photo-print mode using a sheet of plain paper as a print sheet, the pre-coat ink is printed on the surface of the sheet of plain paper before images are formed thereon by C (cyan), M (magenta), Y (yellow), and K (black) ink.

Nozzles (not shown) of each ink head eject ink droplets to pixels specified by the print job, the number of the ink droplets corresponding to the tone level specified by the print job for the respective pixels.

The control unit 10 is connected to a display 80 which is located at an upper portion of the inkjet recording apparatus 1. The display 80 can be used as, for example, an input operation unit on which a user inputs copy conditions for copying an original set in the scanner 101, such as the number of copies and copy ratio.

The control unit 10 of the inkjet recording apparatus 1 is configured to cause the printing unit 102 to perform print operation, and as shown in FIG. 1, includes a CPU 90. The CPU 90 controls the operation of the scanner 101 and the printing unit 102 based on programs and setting information stored in a ROM 91, according to items inputted and set through the display 80.

The control unit 10 is provided with a RAM 92 in which to store, as needed, a print job inputted from the client terminal 14 to the control unit 10 and various conditions, such as the number of copies, inputted and set through the display 80.

The RAM 92 is provided with a frame memory area in which to temporarily store raster data on an original image generated by the CPU 90 based on a print job inputted to the control unit 10 from the client terminal 14, until the raster data is outputted to the printing unit 102.

The control unit 10 is also provided with an external storage device 93, which is connected to the CPU 90. The external storage device 93 is provided with multiple areas for storing a print job transferred from the RAM 92 described above.

The client terminal 14 is configured by a personal computer (PC) or the like. The client terminal 14 has a CPU 16 configured to execute various kinds of processing based on control programs stored in a ROM 17. The CPU 16 is connected to: a RAM 18 functioning as a working area; an input unit 19 configured by a keyboard, a mouse, and/or the like; an output unit 20 configured by a liquid crystal display or the like; an external storage device 21; and a disk drive 22.

The external storage device 21 has the following areas reserved therein: an area for storing application programs for creating original data on an original image containing text, image, or the like, an area for storing printer driver programs for the inkjet recording apparatus 1, and areas for storing other various application programs. The external storage device 21 also has a database area reserved therein for storing the original data generated by the application programs.

The CPU 16 is an arithmetic device configured by a processor, a memory, and other peripherals, and is configured to activate an application program in the external storage device 21 according to an activation request inputted from the input unit 19. The CPU 16 is also configured to generate, on the running application program, original data on an original image as instructed by, for example, parameters inputted through the input unit 19. The original image of the generated original data is outputted to and displayed on the output unit 20, and if a save request is inputted from the input unit 19, the original data is stored in the database area in the external storage device 21.

The original data stored in the database area in the external storage device 21 is read from the external storage device 21 when a read request is inputted from the input unit 19 while the application program is running. The original image (such as an image of a business form) of the read original data can be outputted to and displayed on the output unit 20, or can be processed on the application program to be generated into new original data.

When a print request is inputted for an original image of the original data generated by the original application program, business-form generating application, or the like, the CPU 16 virtually constructs a printer driver 110 thereon by executing the printer driver program on the CPU 16. Then, the printer driver 110 outputs a print job to the inkjet recording apparatus 1.

The printer driver 110 virtually constructed on the CPU 16 of the client terminal 14 executes a data transformation program on the client terminal 14 to control the inkjet recording apparatus 1 connected to the client terminal 14. As functions for this, the printer driver 110 has, as shown in the functional block diagram in FIG. 2, a layout setting section 110*a*, a color transforming section 110*b*, a halftone processing section 110*c* (an ink-based maximum tone level determination unit and a data volume determination unit), and an output data generating section 110*d* (a job output unit).

Figure 2:
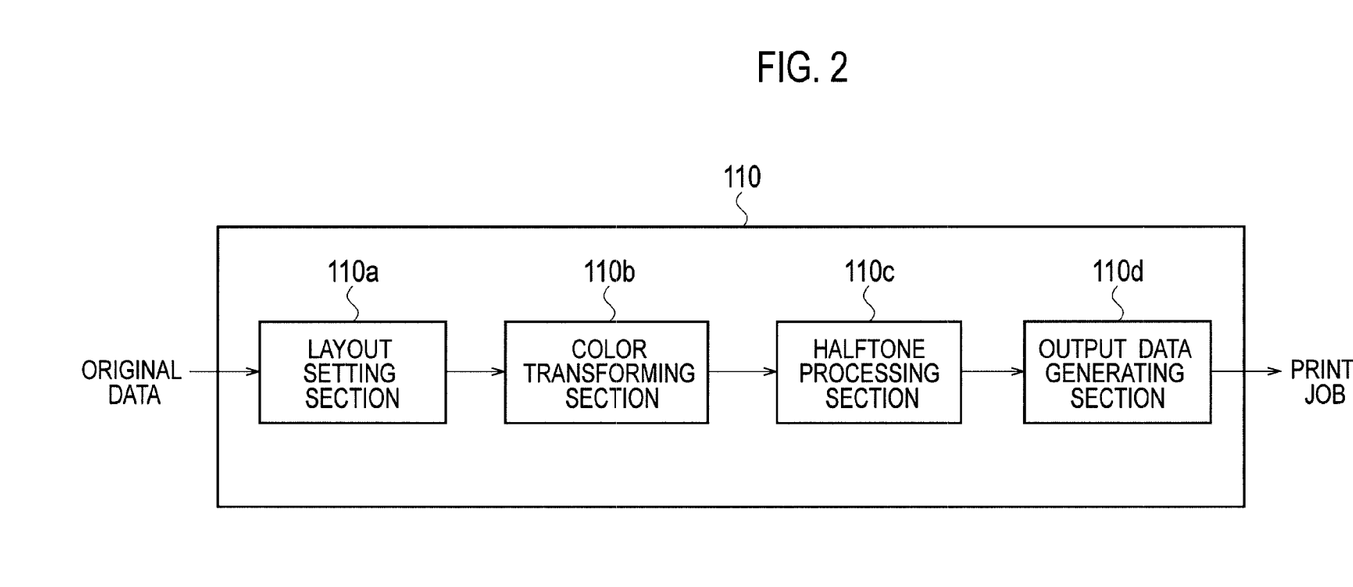
FIG. 2 is a functional block diagram showing an outline of processing performed by a printer driver of a client terminal in FIG. 1.

The layout setting section 110*a* is configured to acquire original data on an original image generated by the original application or the like and generate raster data which is RGB multivalued data defining RGB values of each pixel of the original data. The RGB multivalued data is transformed by the color transforming section 110*b* into multivalued data (CKMY multivalued data) on four colors, namely C (cyan), M (magenta), Y (yellow), and K (black). The CKMY multivalued data is used by the inkjet recording apparatus 1 to print the original data.

The halftone processing section 110*c* is configured to generate, based on the CKMY multivalued data, tone datasets indicating the numbers of ink drops ejected from the nozzles of the ink heads of respective colors. In this event, the halftone processing section 110*c* refers to print setting information acquired as part of the original data.

For example, when a request for printing an original image is inputted while an application program is running, items inputted by the input unit 19 or the like are set as part of the print setting information. The items set in the print setting information include print-paper type, print quality (resolution of raster data), and color mode. The maximum tone levels are set based on these items.

A description is now given of a relation between the contents in the print setting information which are referred to by the halftone processing section 110*c* and a content of tone data generated based on those contents in the print setting information. The maximum tone levels for tone datasets which correspond to the contents in the print setting information are defined in the ROM 17 or the printer driver program stored in the external storage device 21.

First, the print quality in the print setting information includes standard mode (300 dpi) and high-resolution mode (600 dpi). In the high-definition mode, pixels in a main scanning direction are twice as many as those in the standard mode, and therefore the pixel pitch is half of that in the standard mode. For this reason, in order for dots of adjacent pixels not to be superimposed on each other, the maximum tone level for the high-definition mode must be lower than that for the standard mode (lower by, for example, two tone levels).

Next, there are three print-paper types in the print setting information: plain paper, lightweight paper, and matt paper. Having relatively small dot gain, the plain paper and matt paper can select either one of the standard mode and the high-definition mode as the print quality. On the other hand, having relatively large dot gain, lightweight paper can only select the standard mode as the print quality.

In this embodiment, the maximum tone level for the standard mode is six (zero to five drops) for plain paper, four (zero to three drops) for lightweight paper, and eight (zero to seven drops) for matt paper. In the high-definition mode, the maximum tone level is four (zero to three drops) for plain paper and six (zero to five drops) for matt paper.

The color mode in the print setting information includes three modes: color print, black-and-white print, false-color print for black-and-white originals. When the color mode is color print, the above-described maximum tone level is set for each of C (cyan), M (magenta), Y (yellow), and K (black) ink for each pixel. When the color mode is black-and-white print, the above-described maximum tone level is set only for K (black) ink for each pixel.

The false-color print for black-and-white originals is a mode in which a black-and-white original image is transformed into a false-color image based on the gray scale of the black-and-white original image, and printed. The tone level for each of C, Y, M, and K for each pixel is determined by rendering.

In this embodiment, the maximum tone level for K (black) used in false-color print and for each of the other colors, C (cyan), M (magenta), and Y (yellow), is determined depending on the print quality and the print-paper type. However, for each of the colors other than K (black), there are only two ways of printing with them: to print or not to print on that pixel. Thus, the tone level for printing with those colors of ink is fixed at a certain tone level (e.g., one drop in the standard mode). For this reason, each of the colors other than K (black) is represented with one of two tone levels: printed (tone level=1) and not printed (tone level=0).

In the high-definition mode, the tone level for the pre-coat ink is set uniformly, irrespective of which color mode is selected. Specifically, for pre-coat ink, there are only two ways: to coat or not to coat the surface of a sheet of plain paper or matt paper. Thus, the tone level for coating print is fixed at a certain tone level (e.g., three drops). For this reason, the maximum tone level for pre-coat ink in the high-definition mode is two (coating print performed or coating print not performed).

As described above, colors of ink (including pre-coat ink) present in tone data and their maximum tone levels are determined based on the print-paper type, the print quality (resolution of raster data), and the color mode which are set in the print setting information.

Based the maximum tone levels determined based on the contents of the print setting information, the halftone processing section 110c generates tone datasets which indicate the tone level of each pixel for respective colors of ink (including pre-coat ink).

Figure 3A:
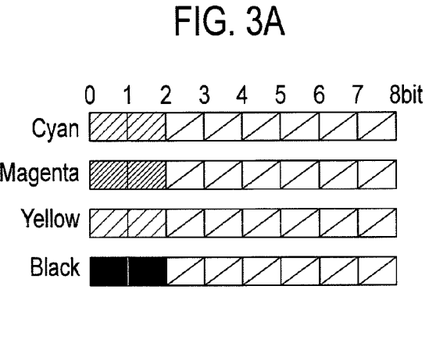
FIG. 3A is a diagram illustrating how a halftone processing section in FIG. 2 transfers tone datasets on respective colors by using pixel-interleaved format, in a case where an original image is to be printed on lightweight paper by color print in standard mode.

As an example, consider a case of printing an original image on a sheet of lightweight paper by color print in the standard mode. In this case, the maximum tone levels of C (cyan), M (magenta), Y (yellow), and K (black) are each four. Thus, as shown in FIG. 3A, the halftone processing section 110c allocates a two-bit data volume for a tone dataset on each color.

Then, in order to transfer the tone datasets on the respective colors to the output data generating section 110d in order of pixels by using a pixel-interleaved format, four frames each having an 8-bit-long data field are needed. In the data field of each frame, 6 bits out of the 8 bits are extra bits having no tone data.

If the output data generating section 110d performs compression processing on the received tone datasets on the respective colors for all the pixels in the original image and thereby generates print data on the original image, the volume of data to be compressed is considerably larger than the actual volume of the tone data because of the extra bits. The compression efficiency is therefore low.

Figure 3B:
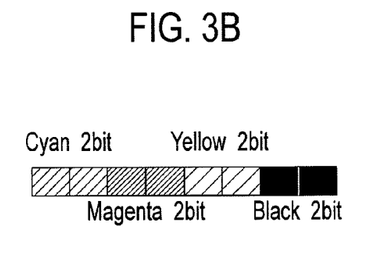
FIG. 3B is a diagram illustrating how the halftone processing section in FIG. 2 transfers tone datasets on respective colors by using line-interleaved format, in a case where an original image is to be printed on lightweight paper by color print in standard mode.

Thus, in this embodiment, the halftone processing section 110c transfers the tone datasets on the respective colors to the output data generating section 110d in order of scanning lines in the main scanning direction by connecting the tone datasets on the respective colors by using a line-interleaved format, as shown in FIG. 3B. In this way, the tone datasets on the four colors (totaling 8 bits) can be inserted into the data field of one frame and transferred.

This can increase the efficiency of the output data generating section 110d compressing the transferred tone datasets on the respective colors for all the pixels in the original image.

Figure 4A:
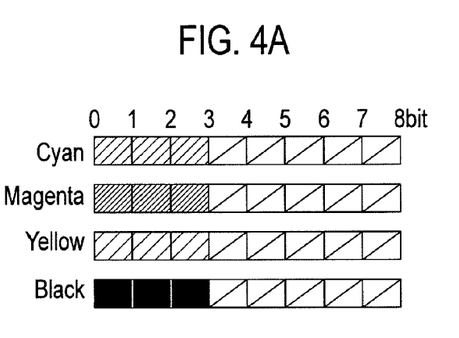
FIG. 4A is a diagram illustrating how the halftone processing section in FIG. 2 transfers tone datasets on respective colors by using the pixel-interleaved format, in a case where an original image is to be printed on matt paper by color print in standard mode.

As another example, consider a case of printing an original image on a sheet of matt paper by color print in the standard mode. In this case, the maximum tone levels of C (cyan), M (magenta), Y (yellow), and K (black) are each eight. Thus, as shown in FIG. 4A, the halftone processing section 110c allocates a three-bit data volume for a tone dataset on each color.

Then, in order to transfer tone datasets on the respective colors to the output data generating section 110d in order of pixels by using the pixel-interleaved format, four frames each having an 8-bit-long data field are used, and in the data field of each frame, 5 bits out of the 8 bits are extra bits.

Figure 4B:
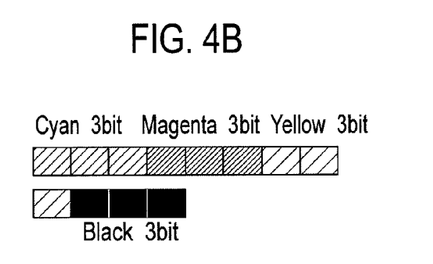
FIG. 4B is a diagram illustrating how the halftone processing section in FIG. 2 transfers tone datasets on respective colors by using the line-interleaved format, in a case where an original image is to be printed on matt paper by color print in standard mode.

Also in this case, the efficiency of the output data generating section 110d compressing the tone datasets is low. Thus, in this embodiment, the halftone processing section 110c transfers the tone datasets on the respective colors to the output data generating section 110d in order of scanning lines in the main scanning direction by using the line-interleaved format, as shown in FIG. 4B.

In this way, the tone datasets on the four colors (totaling 12 bits) can be inserted into the data fields of two frames and transferred with only four extra bits. The efficiency of the compression processing by the output data generating section 110d can thus be increased.

Figure 5A:
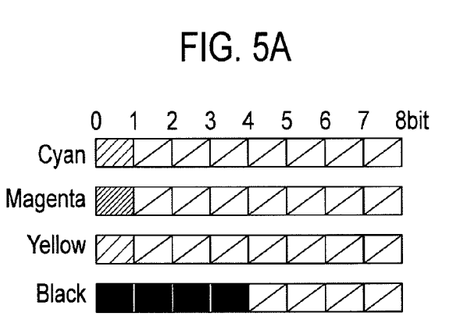
FIG. 5A is a diagram illustrating how the halftone processing section in FIG. 2 transfers tone datasets on respective colors by using the pixel-interleaved format, in a case where a black-and-white original image is to be printed on matt paper by false-color print in high definition mode.

As yet another example, consider a case of printing a black-and-white original image on a sheet of matt paper by false-color print in the high-definition mode. In this case, the maximum tone level for K (black) is nine (zero to eight drops), whereas that for the other colors, namely C (cyan), M (magenta), and Y (yellow), is two: not to print (tone level=0) or to print (tone level=1).

Thus, as shown in FIG. 5A, the halftone processing section 110c allocates a four-bit data volume for a tone dataset on K (black), and a one-bit data volume for a tone dataset on each of C (cyan), M (magenta), and Y (yellow).

In order to transfer the tone datasets on the respective colors to the output data generating section 110d in order of pixels by using the pixel-interleaved format, four frames each having an 8-bit-long data field are used, and in the data field of each frame, either 4 bits (for K (black)) or 7 bits (for the colors other than K (black)) out of the 8 bits are extra bits.

Figure 5B:
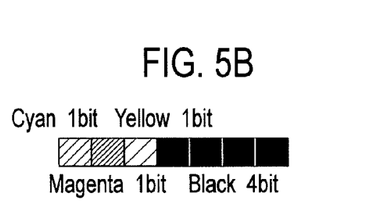
FIG. 5B is a diagram illustrating how the halftone processing section in FIG. 2 transfers tone datasets on respective colors by using the line-interleaved format, in a case where a black-and-white original image is to be printed on matt paper by false-color print in high definition mode.

Also in this case, the efficiency of compressing the tone data by the output data generating section 110d is low. Thus, in this embodiment, the halftone processing section 110c transfers the tone datasets on the respective colors in order of scanning lines in the main scanning direction by using the line-interleaved format, by deleting the regions not in use and grouping the regions in use, as shown in FIG. 5B.

In this way, the tone datasets on the four colors (totaling 7 bits) can be inserted into the data field of one frame and transferred with only one extra bit. The efficiency of compressing the tone data by the output data generating section 110d can thus be increased.

Instead of the line-interleaved format, the tone datasets on the respective colors may be transferred to the output data generating section 110d in order of pages by using a band-sequential format. This allows further reduction in the number of frames and the number of extra bits used to transfer the tone datasets on the respective colors for all the pixels in an original image, and therefore allows increase in the efficiency of compressing the tone data by the output data generating section 110d.

As described using the above examples, the output data generating section 110d receives tone datasets on the respective colors for all the pixels of an original image from the halftone processing section 110c, performs compression processing on the tone datasets, and thereby obtains print data on the original data. The CPU 16 (the output data generating section 110d) incorporating the printer driver 110 shown in FIG. 1 outputs the print data compressed by the output data generating section 110d, from the external interface 15 of the CPU 16 to the external interface 11 of the control unit 10, as a print job along with the print setting information described earlier.

Figure 6:
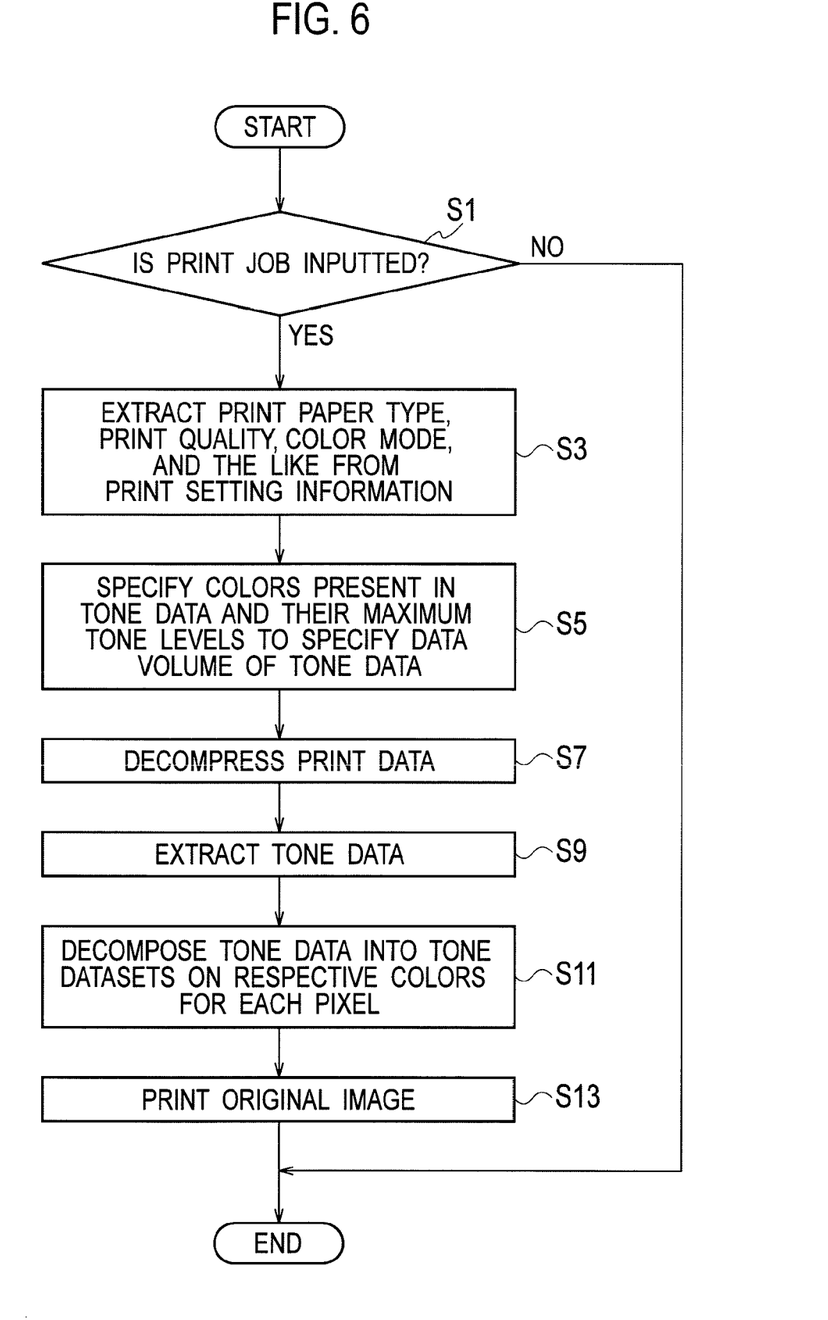
FIG. 6 is a flowchart showing a procedure of processing for decomposing tone data in a received print job into tone datasets on respective colors for each pixel, the processing being performed by a CPU of a control unit in FIG. 2 according to a program stored in a ROM.

Next, with reference to a flowchart in FIG. 6, a description is given of a procedure of processing that the CPU 90 of the control unit 10 of the inkjet recording apparatus 1 performs according to the programs stored in the ROM 91 based on a print job outputted from the printer driver 110 of the CPU 16 of the client terminal 14.

First, the CPU 90 checks whether a print job is inputted thereto by the client terminal 14 or not (Step S1). If no print job is inputted (NO in Step S1), the CPU 90 stands by until a print job is inputted. If a print job is inputted (YES in Step S1), the CPU 90 extracts contents such as print-paper type, print quality (resolution of raster data), and color mode from the print setting information in the inputted print job (Step S3).

Then, the CPU 90 specifies, based on the extracted contents of the print setting information, colors of ink (including pre-coat ink) present and their maximum tone levels, and based on the specified maximum tone levels, specifies the pre-compressed data volume of print data which is compressed and contained in the print job, i.e., the data volume of each of the tone datasets on the respective colors for all the pixels in the original image (Step S5).

Information on the maximum tone level for each pixel of each color of tone datasets that corresponds to the print-paper type, the print quality (resolution of raster data), and the color mode set in the print setting information is defined in the programs stored in the ROM 91, a corresponding table stored in the external storage device 93, or the like. Hence, in specifying the data volume in Step S5, the CPU 90 refers to the above-described information on the maximum tone level for the tone datasets.

Subsequently, the CPU 90 decompresses the print data in the inputted print job by using a method corresponding to a compression method used by the output data generating section 110*d* of the printer driver 110 in the client terminal 14 (Step S7).

Then, the CPU 90 extracts tone data having the data volume specified in Step S5 from the decompressed data (Step S9), and based on the colors of ink (including pre-coat ink) present and their maximum tone levels, decomposes (reproduces) the tone data into tone datasets on the respective colors of ink (including pre-coat ink) for each pixel of the original image (Step S11).

The program in the ROM 91 or the corresponding table in the external storage device 93 defines, in advance, which of the line-interleaved format and the band-sequential format is used to transfer the tone datasets on the respective colors for all the pixels in the original image (print data) contained in the print job sent from the client terminal 14. Hence, the decomposition into the tone datasets for each pixel in Step S11 is performed in consideration of the defined transfer format.

Next, according to the print setting information, the CPU 90 drives the printing unit 102 to print the original image on a print sheet based on the tone levels set in the decomposed tone datasets on the respective colors of ink (including pre-coat ink) for each pixel (Step S13), and ends the print job. With that, the procedure ends.

As is apparent from the above description, in this embodiment, in Step S1 in FIG. 6, the CPU 90 functions as a print job reception unit. In Step S5 in FIG. 6, the CPU 90 functions as an ink-based maximum tone level specification unit. In Step S11 in FIG. 6, the CPU 90 functions as a data decomposition unit.

In the print network system of this embodiment configured as above, the printer driver 110 of the client terminal 14 generates tone data on an original image (print data) by connecting tone datasets on respective colors by using the line-interleaved format or the band-sequential format, based on the maximum tone levels for the colors specified from the print setting information.

Hence, the halftone processing section 110*c* of the printer driver 110 can transfer to-be-compressed tone data on an original image to the output data generating section 110*d* with a reduced number of frames and a reduced number of extra bits occurring in the data fields in the frames. Since the tone data on an original image to be compressed by the output data generating section 110*d* can thus be reduced in data volume, the tone data on the original image transferred as print data in a print job can be efficiently reduced in data volume through the data compression.

Moreover, upon receipt of a print job from the client terminal 14, the inkjet recording apparatus 1 specifies the maximum tone level for each color of ink based on the print setting information in the print job, thereby specifying the pre-compressed data volume of the compressed tone data (print data) in the print job.

Thus, in accordance with the format (the line-interleaved format or the band-sequential format) used by the printer driver 110 of the client terminal 14 to connect the tone datasets on the respective colors, the decompressed tone data can be decomposed (reproduced) into tone datasets on respective colors for each pixel by sectioning the decompressed tone data according to the numbers of bits corresponding to the specified maximum tone levels.

Consequently, when tone datasets on respective colors of ink for each pixel of an original image to be printed using multiple colors of ink (including pre-coat ink) are compressed, included in a print job, and transferred from the client terminal 14 to the inkjet recording apparatus 1, the tone data to be compressed by the output data generating section 110*d* of the printer driver 110 of the client terminal 14 can be reduced in data volume. The efficiency of data compression is thus increased so that the tone data on an original image outputted (transferred) from the client terminal 14 to the inkjet recording apparatus 1 can be efficiently reduced in data volume through the data compression.

Although an inkjet recording apparatus is used as an example of a printer in the above embodiment, the present invention is not limited to an inkjet printing apparatus, but can be widely applied to a case where the printer is a printing apparatus employing a method other than the inkjet method, such as an electrophotographic method or a stencil printing method.

In addition, the present invention is not limited to full-color print, but can be applied to a case of, for example, performing black-and-white (single color) print using functional ink as well.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A client terminal comprising:
    a processor;
    a memory including instructions that, when executed by the processor, cause the processor to perform operations including:
    generating raster data on an image to be printed with first and second colors of ink;
    determining a first maximum tone level for the first color of ink and determining a second maximum tone level for the second color of ink for the generated raster data, based on contents of a print setting information of the image;
    generating a first tone dataset corresponding to the first color of ink and a second tone dataset corresponding to the second color of ink for each pixel of the image based on the determined first and second maximum tone levels; and
    transferring both the generated first and second tone datasets as the raster data in a third frame including a predetermined number of data fields to receive the first and second tone datasets by connecting the generated first and second tone datasets using a line-interleaved format or a band-sequential format, the connecting of the generated first and second tone datasets comprising:
   determining a first number of data fields allocated in a first frame for the first tone dataset, and determining a second number of data fields allocated in a second frame for the second tone dataset, one of the first frame or the second frame including one or more empty data fields that does not include the first or second tone datasets;
   when a total number of the first number of data fields and the second number of data fields is less than or equal to the predetermined number of data fields included in the third frame, inserting all of the generated first and second tone datasets into the third frame, the third frame excluding the one or more empty data fields included in the one of the first frame or the second frame; and
   when the total number of the first number of data fields and the second number of data fields is more than the predetermined number of data fields included in the third frame, inserting all of the generated first tone dataset and a part of the generated second tone dataset into the third frame and inserting a remaining part of the generated second tone dataset that is not inserted into the third frame into a fourth frame; and
outputting a print job to a printer containing the transferred raster data and the print setting information.

2. The client terminal according to claim 1, wherein the instructions, when executed by the processor, cause the processor to perform operations including:
   performing compression processing on the transferred raster data to obtain print data; and
   outputting the print job to the printer containing the obtained print data and the print setting information.

3. A printer comprising:
   a printer processor;
   a printer memory including instructions that, when executed by the printer processor, cause the printer processor to perform operations including:
   receiving the print job from the client terminal according to claim 1;
   specifying the first and second maximum tone levels for the raster data on the image based on the print setting information received from the client terminal and specifying data volume of the raster data based on the specified first and second maximum tone levels;
   decomposing the raster data having the specified data volume into the first tone dataset corresponding to the first color of ink and the second tone dataset corresponding to the second color of ink for each pixel according to the line-interleaved format or the band-sequential format employed to connect the first tone dataset of the first color of ink and the second tone dataset of second color of ink for each pixel of the raster data; and
   sending a command to print the image based on the decomposed first and second tone datasets.

4. A printer system comprising:
a client terminal; and
a printer,
wherein the client terminal comprises:
   a processor;
   a memory including instructions that, when executed by the processor, cause the processor to perform operations including:
      generating raster data on an image to be printed with first and second colors of ink;
      determining a first maximum tone level for the first color of ink and determining a second maximum tone level for the second color of ink for the generated raster data, based on contents of a print setting information of the image;
      generating a first tone dataset corresponding to the first color of ink and a second tone dataset corresponding to the second color of ink for each pixel of the image based on the determined first and second maximum tone levels and transferring both the generated first and second tone datasets as the raster data in a third frame including a predetermined number of data fields to receive the first and second tone datasets by connecting the generated first and second tone datasets using a line-interleaved format or a band-sequential format, the connecting of the generated first and second tone datasets comprising: determining a first number of data fields allocated in a first frame for the first tone dataset, and determining a second number of data fields allocated in a second frame for the second tone dataset, one of the first frame or the second frame including one or more empty data fields that does not include the first or second tone datasets; when a total number of the first number of data fields and the second number of data fields is less than or equal to the predetermined number of data fields included in the third frame, inserting all of the generated first and second tone datasets into the third frame, the third frame excluding the one or more empty data fields included in the one of the first frame or the second frame; and when the total number of the first number of data fields and the second number of data fields is more than the predetermined number of data fields included in the third frame, inserting all of the generated first tone dataset and a part of the generated second tone dataset into the third frame and inserting a remaining part of the generated second tone dataset that is not inserted into the third frame into a fourth frame; and
      outputting a print job to the printer containing the transferred raster data and the print setting information, and
wherein the printer comprises:
   a printer processor;
   a printer memory including instructions that, when executed by the printer processor, cause the printer processor to perform operations including:
      receiving the print job from the client terminal;
      specifying the first and second maximum tone levels for the raster data on the image based on the print setting information received from the client terminal and specifying data volume of the raster data based on the specified first and second maximum tone levels;
      decomposing the raster data having the specified data volume into the first tone dataset of the first color of ink and the second tone dataset of the second color of ink for each pixel according to the line-interleaved format or the band-sequential format employed by the client terminal to connect the first tone dataset of the first color of ink and the second tone dataset of the second color of ink for each pixel of the raster data; and
      sending a command to print the image based on the decomposed first and second tone datasets.

5. The client terminal according to claim 1, wherein the first and second maximum tone levels are set based on a print-paper type, a print quality, and a color mode.

6. The client terminal according to claim 5, wherein settings for the print-paper type are plain paper, lightweight paper, and matte paper.

7. The client terminal according to claim 5, wherein settings for the print quality are standard resolution and high resolution.

8. The client terminal according to claim 5, wherein settings for the color mode are color print, black-and-white print, false-color print for black-and-white originals, and print accompanying coating of a paper surface with pre-coat ink.

9. The printer system according to claim 4, wherein the first and second maximum tone levels are set based on a print-paper type, a print quality, and a color mode.

10. The printer system according to claim 9, wherein settings for the print-paper type are plain paper, lightweight paper, and matte paper.

11. The printer system according to claim 9, wherein settings for the print quality are standard resolution and high resolution.

12. The printer system according to claim 9, wherein settings for the color mode are color print, black-and-white print, false-color print for black-and-white originals, and print accompanying coating of a paper surface with pre-coat ink.

\* \* \* \* \*

UNITED STATES PATENT AND TRADEMARK OFFICE
CERTIFICATE OF CORRECTION

PATENT NO. : 9,529,554 B2
APPLICATION NO. : 14/535570
DATED : December 27, 2016
INVENTOR(S) : Akiyama It is certified that error appears in the above-identified patent and that said Letters Patent is hereby corrected as shown below:

In the Claims

Column 13, Line 54 (Claim 3), please change "of second" to -- of the second --.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*